Patented Mar. 18, 1941

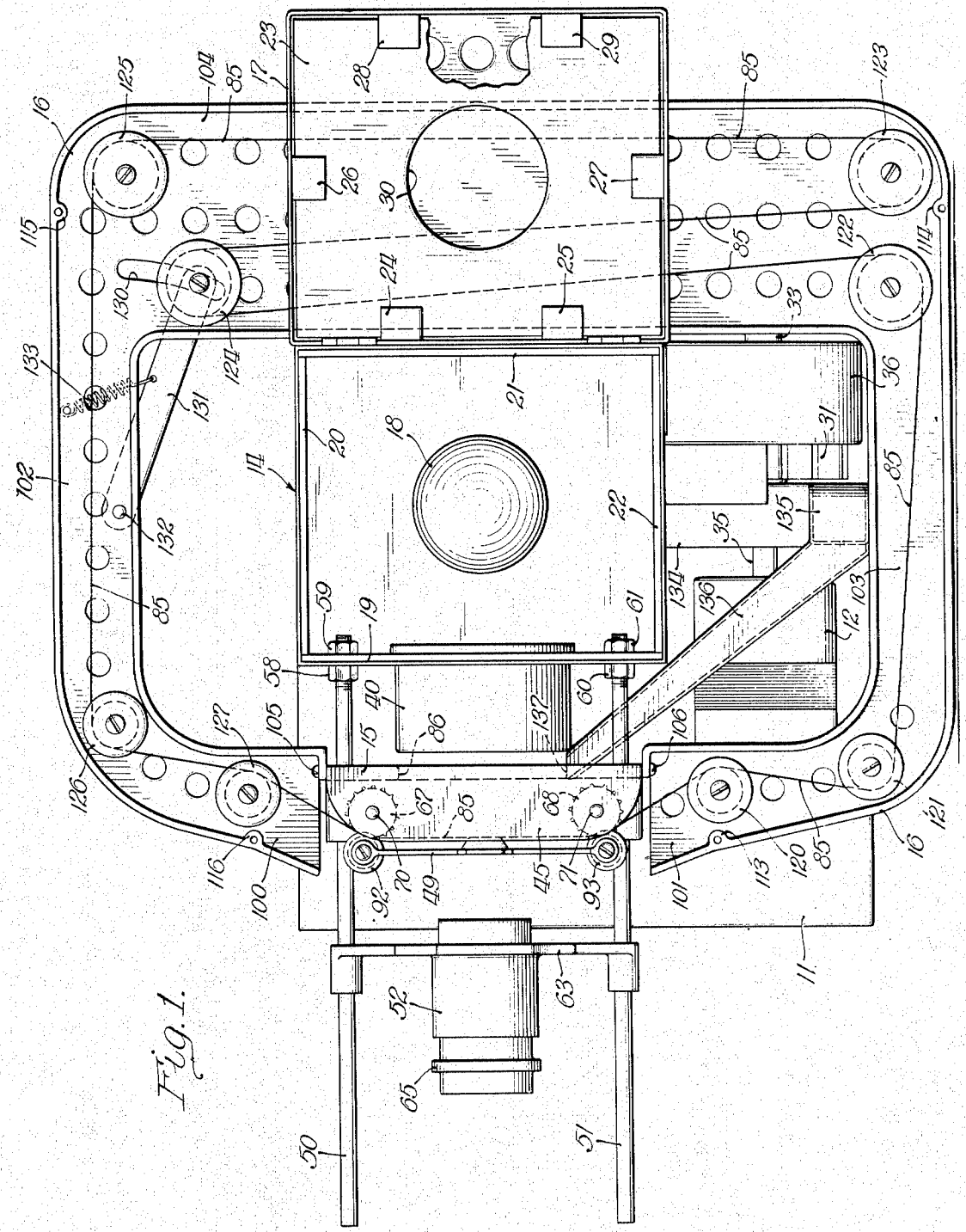

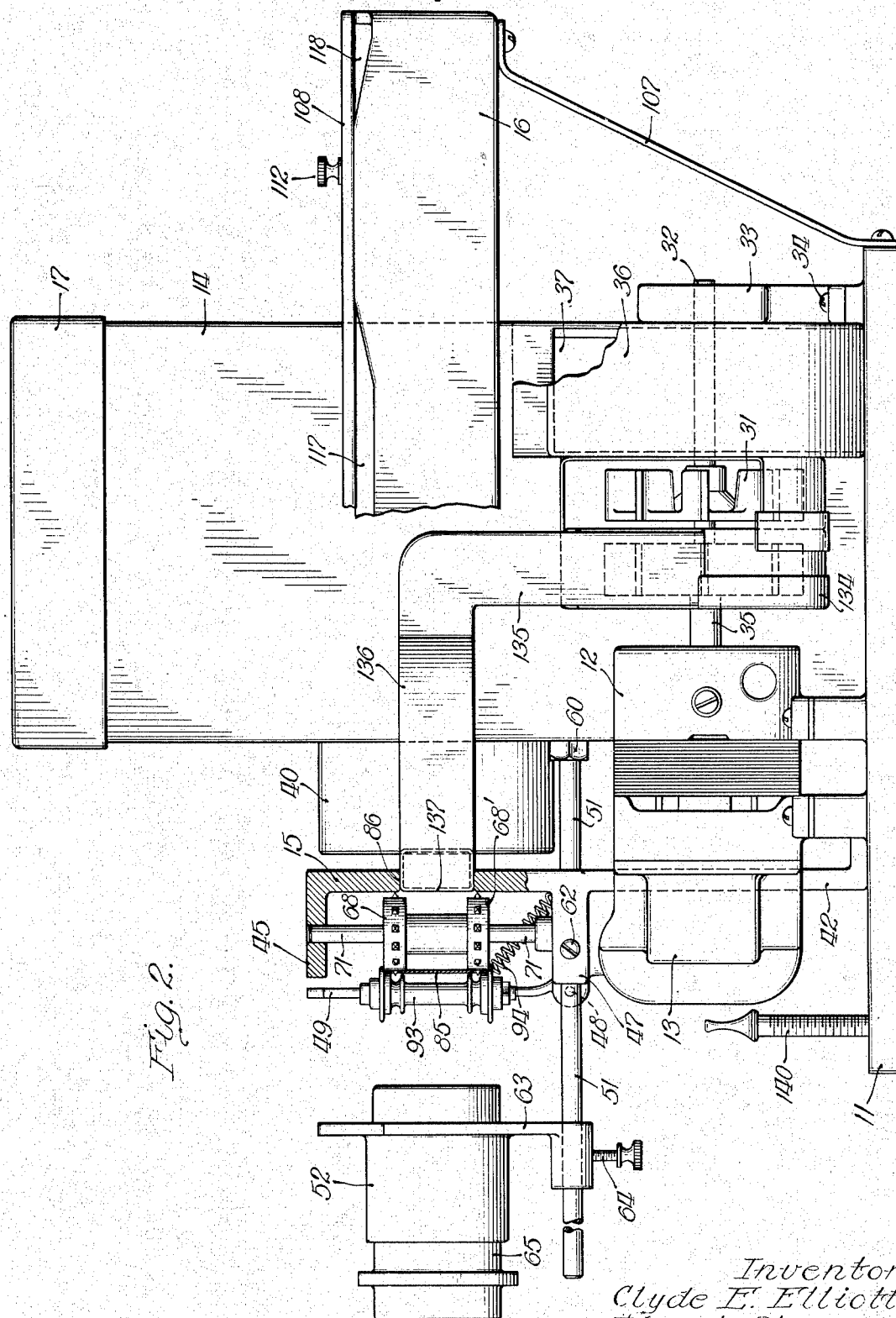

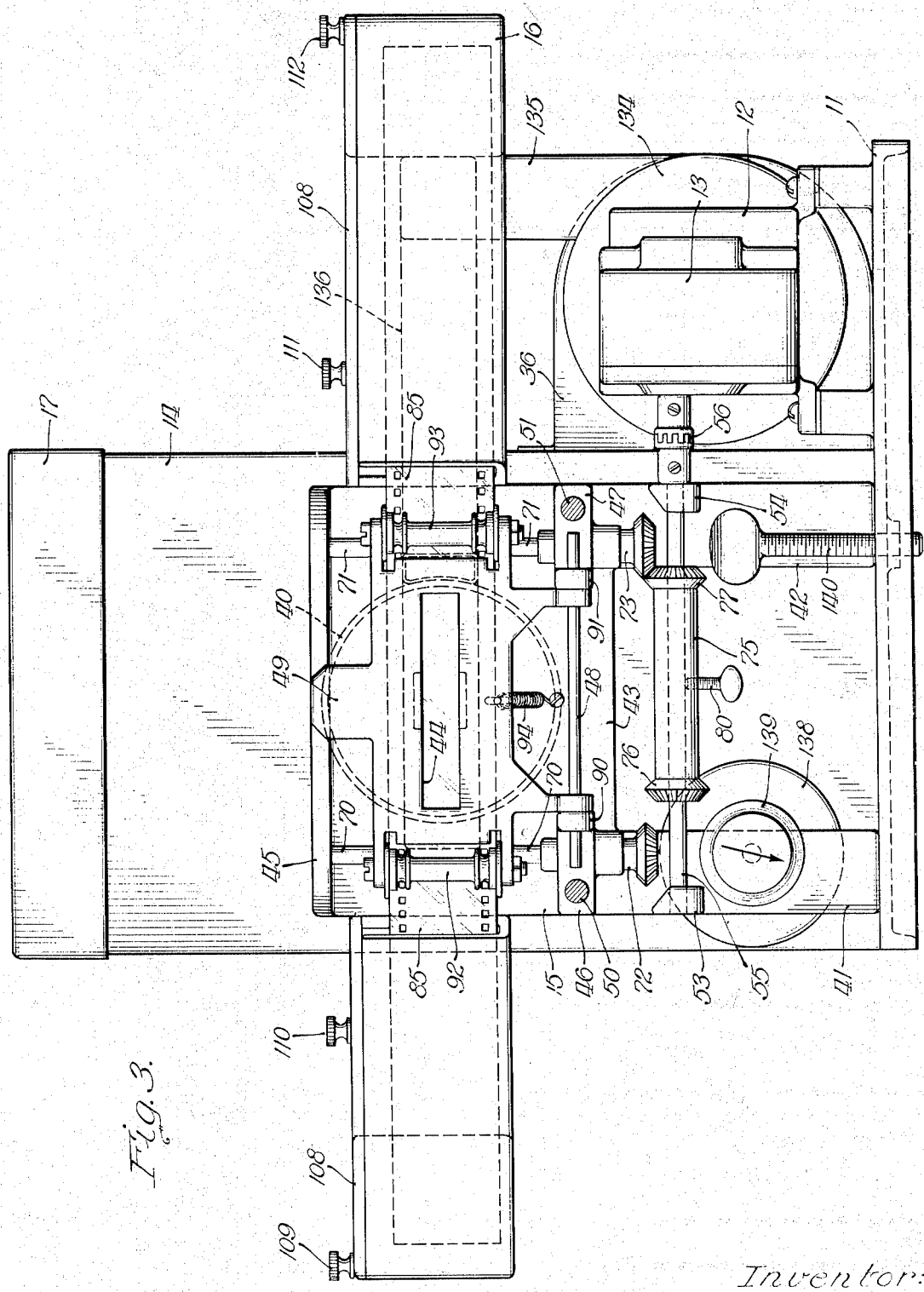

2,235,701

UNITED STATES PATENT OFFICE 2,235,701

PROJECTION DEVICE

Clyde E. Elliott and Frank Shaven, Chicago, Ill., assignors, by mesne assignments, to said Elliott Application April 20, 1938, Serial No. 203,038

3 Claims. (Cl. 88—28)

This invention relates to projection devices, and is more particularly concerned with a sign projection machine wherein signs or characters provided on a moving transparent film, strip or the like are projected on a suitable surface serving as a screen.

Apparatus of this type which have been proposed before, e. g., such as shown in the United States Patent No. 1,885,841, issued November 1, 1932, have disadvantages and drawbacks which are avoided in the structure disclosed herein.

Some of the objects of the present invention may be concisely stated as follows:

One object is concerned with a sign projection machine wherein the salient individual parts are housed in separate housings or casings.

Another object is concerned with a device of this type provided with means for withdrawing the heated air from the lamp casing in conjunction with additional means for blowing cold air upon the moving projection film at a point where it is exposed to the heat rays.

Still another object relates to the provision of means for increasing the length of the film and for properly tensioning the film.

A further object relates to the provision of a filter in front of the projection or condenser lenses so as to absorb the heat rays for the purpose of conserving the film.

The above noted objects and other novel features not yet specifically mentioned will appear from the following detailed description which is rendered with reference to the drawings. In these drawings—

Fig. 1 shows a top view of the device;

Fig. 2 shows a side view with certain parts in section or broken away in order to show interior mechanisms; and Fig. 3 is a front view of the device, with some parts omitted and other parts in section for the purpose of facilitating the description.

Like parts are designated by like reference numerals in all of the drawings. Elements which may safely be assumed to be well known will be described only insofar as necessary for conveying a clear understanding of the invention.

Referring now to the drawings, numeral 11 indicates a base carrying the motor 12 with a gear casing 13; the lamp housing 14; a film holder including the bracket 15 which carries the sprockets and auxiliary film-transporting and sign-focusing devices; and the film track casing 16. The assembly and coaction of these and other details will presently appear as the description progresses.

The lamp housing 14 comprises a suitably shaped, vertically disposed sheet metal box carrying a lid 17. In Fig. 1 the lamp housing is shown with the lid 17 open, exposing the projection lamp 18. The lamp housing is heat insulated; e. g., it may be lined with suitable heat-resisting material such as sheets of asbestos, as indicated at 19, 20, 21, and 22. The lid 17 may also be provided with a disk or sheet of heat-resisting material 23 secured by the ears or projections 24—25, 26—27, and 28—29. This sheet is preferably positioned in spaced relation to the top of the lid 17, leaving an internal space which communicates with the cutout 30 in the sheet 23. The top of the lid may be suitably perforated, as indicated, so as to admit the air into this space and then through the cutout 30 into the interior of the housing 14, when the lid is closed.

In order to take care of determined ventilation of the lamp housing, there is provided a fan rotor 31 (Figs. 1 and 2) mounted on a shaft 32 which is journalled in a bearing bracket 33 secured on the base 11, as indicated at 34 (Fig. 2). This shaft is operated by the motor 12 and is an extension of the motor shaft 35. The fan rotor 31 is placed in front of a suction casing 36 which opens into the lamp housing 14 at the bottom thereof, as indicated at 37 in Fig. 2. Accordingly, when the motor rotates the shaft 35 and with it the fan rotor shaft 32, the rotor 31 is actuated and exhausts the air from the lamp housing by way of the exhaust casing 36. Fresh air is sucked into the lamp housing through the perforations on top of the lid 17 into the space defined by the insulating sheet 23 downwardly into the lamp housing to the bottom opening 37 (Fig. 2), where the air is expelled by the action of the rotor fan 31. The lamp 18 is thus continually cooled.

On the forward face of the lamp housing is provided a tubular extension 40 which extends directly in back of the film holder bracket 15 and carries in its interior the usual condenser lenses and also, if desired, a filter for eliminating the heat rays. Light from the lamp 18 is thus collected and is trained forwardly on a line substantially perpendicular to the lamp housing so as to illuminate the transparent film carrying the signs to be projected or displayed.

The projection and focusing apparatus is also mounted on the film holder bracket member 15, as previously mentioned. The bracket itself comprises the two uprights 41 and 42, both shown in the front view of Fig. 3, which rise from the base 11 and are united in the center portion by a cross piece 43 which carries an opening 86 (Fig. 1) in back of the opening 44 (Fig. 3) provided in a hingedly mounted film-steadying member 49. On top of the holder brackets is provided a forwardly-projecting cross portion 45 and intermediate forwardly-projecting members 46—47, the latter carrying the journal rod or shaft 48 of the movable film-steadying device 49 and also the forwardly-extending rods 50 and 51 supporting the focusing apparatus 52 with the lens casing 65. This multiple bracket member also carries on its uprights 41 and 42 two projections 53 and 54 (Fig. 3), respectively, in which is journalled the idler shaft 55 coupled directly to the motor 13 by means of the clutch coupling 56. The multiple holder bracket member with all its projections and extensions may be made of an integral casting, if desired.

The rods 50—51 extend through the projections 46 and 47 back to the lamp housing 14 and are mounted on the lamp housing by means of nuts, such as indicated in Fig. 1 at 58—59 and 60—61. Screws, such as 62 (Fig. 2) may be secured on the bracket projections 47 and 46 so as to fix these rods 50 and 51 in place and prevent inadvertent turning. The focusing assembly mounted on these rods 50 and 51 consists of the cross support 63 carrying the tubular holder 52. The cross support may be fixed at any position on the rods 50 and 51 by means of the set screw 64, as shown in Fig. 2. Inserted in the tubular holder 52 is the casing 65 which carries the usual focusing lenses. The rough focusing of the signs to be projected (which are provided on the film or strip) may therefore be made by sliding the entire cross support 63 with its tubular holder 52 and lens casing 65 with respect to the rest of the assembly, determining the rough distance of the focusing lenses from the film to be projected. The fine adjustment is then made by rotating the tubular casing 65 so as to slide the focusing lenses to the desired position.

The film holder comprises the sprocket members 67 and 68 each having an upper and a lower sprocket, as shown in Fig. 2 at 68', and each mounted on a shaft, such as 70 and 71, respectively. These shafts are journalled at the top in the cross piece 45 of the bracket support and extend downwardly through the bracket projections 46 and 47, and each carries at its lower end a pinion, as indicated at 72 and 73, respectively (see Fig. 3). The shaft 55 operated by the motor 12 through the gear means 13 and clutch coupling 56 is provided with a slidable bushing 75 carrying a pinion, such as 76 and 77, at each end thereof. This pinion bushing may be fixed on the shaft 55 either in the position shown in Fig. 3 with drive pinion 77 engaging the driven pinion 73, or in the alternate position with the drive pinion 76 engaging the driven pinion 72. The bushing 75 may be secured on the shaft 55 in either alternate position by means of the set screw 80. Assuming now that the motor 12 operates, and that the drive is coupled with pinions 77 and 73 in engagement, it will be clear that the shaft 71 carrying the sprockets 68—68' will be rotated as a driven shaft and will carry the film 85 in the proper direction determined by the rotation of the motor and by the drive coupling as described. The film 85 (the mounting and steadying of which will presently be described) thus travels in front of the opening 86 in the bracket 15 (Figs. 1 and 2); that is, it travels in front of the collected light emanating from the lamp housing and projected through the opening 86.

In order to secure the proper operation of the film transport, there is provided a film-steadying device 49 which is hingedly secured on the shaft 48, and this shaft in turn is journalled in the projections 90 and 91 (Fig. 3) which extend forwardly from the bracket projections 46 and 47. This steadying device carries two idler rollers 92 and 93 provided with suitable guide grooves which attach against the film 85 on the sprocket members 67 and 68, as particularly indicated in Fig. 2. A spring 94 is secured between the steadying device and the cross plate 43 of the holder bracket so as to provide the requisite tension, holding the steadying device in the operating position with the rollers 92—93 against the film, as shown in the drawings. If it is desired to change the film, the steadying device 49 is tilted forward (to the left, as shown in Figs. 1 and 2), disengaging the film 85, whereupon the film is lifted off the sprockets and removed. The opening 44 is provided on the steadying device in alignment with the light projection opening 86 in the holder bracket, and the light emanating from the lamp 18 in the lamp housing 14 is thus trained upon that film portion which happens to be positioned at any time directly in the line of the light rays. The image of the signs on the film then passes to the focusing lenses within the tubular casing 65 and is focused upon a suitable screen surface in a well known manner.

The film track casing 16 may be made of an integral casting which, in the embodiment shown, is roughly U-shaped when looking down upon the apparatus as in Fig. 1, with the forward ends 100 and 101 of the two opposite legs 102 and 103, respectively, rising from the base 104, extending inwardly and attached at 105 and 106, respectively, to the uprights of the holder bracket 15. The film track casing is supported at the opposite end by means of brackets such as 107 secured to the base 11, as shown in Fig. 2. The casing is U-shaped in cross section and may be covered by a lid 108, as is particularly apparent from Figs. 2 and 3, thus forming a tubular structure which is disposed circumferentially around the lamp housing and secured to the holder bracket 15. The lid 108 may be attached to the open walls of the casing by means of thumb screws, such as indicated at 109—112, inclusive. The casing is provided with interior bosses, as shown in Fig. 1 at 113, 114, 115 and 116, for taking the thumb screws 109—112, inclusive. The wall of the casing base 104 (Fig. 1), and also the side walls of the portions 102 and 103 are slightly recessed or cut out, as indicated in Fig. 2 at 117 and 118, respectively, in order to permit proper ventilation of the film track casing when the lid 108 is put in place.

Within the film track casing are mounted spools, as indicated in Fig. 1 at 120—127, inclusive, for movably supporting the film or strip 85, as shown. It will be noted that the film extends from the spool 122 by way of the spool 124 back to spool 123 which is mounted adjacent spool 122. This arrangement accommodates a film of appreciably greater length than was heretofore possible in such machines. The shaft of the spool 124 is supported in a curved slot 130 (Fig. 1) and is attached to a lever 131 which is suitably journalled at the bottom of the casing at point 132. A tension spring 133 is anchored at one end to the lever 131, and is attached at the other end to the film track casing. The lever 131, and with it the spool 124 are therefore always biased in anticlockwise direction, putting tension on the film portion which extends between the spools 122 and 123 by way of the spool 124. Numerous openings are shown at the bottom of the film track so as to permit proper ventilation of the track casing.

The structure so far described presents numerous novel features of which the ventilation of the lamp housing through the rotor fan 31 is one, while another important feature resides in the structure and arrangement of the film track casing and the function of its individual parts. There is another feature which is also considered of importance in this disclosure, aiming at the ventilating of the film casing and direct cooling of the film at the point where it is exposed to the heat rays emanating from the projection lamp and also contemplating cooling of the motor. This provision comprises a second rotor fan contained in the casing 134 adjacent the rotor fan 31, but separated from it. The rotor blades of this fan are indicated in dotted lines in Fig. 2. This rotor is also mounted on the shaft 32 which is an extension of the motor shaft 35 journalled at its rear end in the bracket 33. A funnel 135 is secured to the rotor casing 134, rising from it and is joined at its upper end with a horizontally-extending tapering funnel 136, the forward end of which terminates at 137 at one side of the opening 86 in the bracket 15 in back of the film 85. Cold air is sucked in centrally from the outside, and partly also through slots in the motor casing 12, by the rotor blades of the fan in the casing 134 and is forced through the funnel sections 135—136 and expelled at the funnel end 137 and blown directly in back of the film section which at any moment happens to pass the projection opening of the device. The film therefore is cooled at the point where it is exposed to the effect of the heat rays. The stream of cooling air thus blown against the back of the film is, of course, also effective to ventilate the film housing. The air sucked in through the slots in the motor casing and around the motor effects cooling of the motor and thus preserves its life. The life of the film is considerably increased and, of course, the hazards that may be connected with the operation of such a device are to all practical intents and purposes eliminated. Other incidental advantages result from this provision, which appear apparent and are, therefore, not mentioned in detail.

The circuit arrangement for the device has not been shown because it is well known to anyone who is experienced in this art and informed about the intended functions of the device as herein described. The circuit, of course, must include a current source and a suitable cord, preferably with a switch attached to it for controlling the connection and disconnection of the current for the actuation of the motor and the lamp. An adjusting device is included for regulating the speed of the motor, which may be in the form of a rheostat 138 provided with a suitable knob 139. The winding of the rheostat may be connected in the circuit and when the knob 139 is turned, the resistance may be increased or decreased, as the case may be, so as to adjust the speed of the device, which is necessary and desirable for any particular operating condition.

In order to position the machine correctly, there is also provided a set screw 140 attached at the forward end to the base 11, as shown in Figs. 2 and 3, and the front of the machine may thus be raised or lowered as conditions demand. It is understood, of course, that such set screws or equivalent devices may be provided at any other alternate or additional point of the machine.

The operation is as follows: The film carrying the transparent signs may be in the form of an endless film strip or band. It is inserted first, and this operation is preceded by removing the lid 108 from the film track casing and tilting the steadying device 49 forward so as to free the sprockets 67 and 68 for the reception of the film. The film 85 is then threaded over the spools in the film track, as shown, and properly put on the sprockets whereupon the steadying device 49 is closed. The lid or cover 108 may be replaced on the film casing. The machine is then roughly trained toward the receiving surface which may be any suitable surface or any suitable screen, and the current is switched on. The speed of the motor is adjusted by the rheostat 138—139, and the signs or message then appear on the screen surface, the sequence of the characters or signs thus projected corresponding to their placing on the film strip. The apparatus is properly focused, at first roughly, by shifting the carrier 63—52 on the rods 50—51, and finally moving the focusing lenses contained in the tube 55 within the tubular carrier 52 until the message properly appears on the screen surface with the desired clarity and intensity.

Changes may be made within the scope and spirit of the appended claims wherein we have defined what is believed to be patentable and what is desired to have protected by Letters Patent of the United States.

We claim as our invention:

1. In a sign projection machine of the class described, a vertically-disposed lamp housing, lens means mounted on the side of said housing, a lamp in said housing for producing light to be trained to the outside thereof through said lens means, a film carrying transparent signs, a film holder positioned in front of said lens means, comprising an apertured bracket and sprocket means thereon for moving said film past the light trained to the outside through said lens means, a film housing disposed peripherally around said lamp housing and secured to said bracket, means in said film housing for movably supporting said film, motor means for actuating said sprocket means to move said film, means actuated by said motor means for cooling said lamp by circulating air through said lamp housing, and means also actuated by said motor means for blowing cooling air against the section of said film which is illuminated by the light emitted through said lens means.

2. In a sign projection apparatus, a light source, a housing for said source, a lens holder mounted in one wall of said housing for forming a light beam, a film, guiding means for said film spaced away from said lens holder, means for advancing said film through said guiding means and across the path of said light beam, a motor, means for connecting one end of the motor shaft to said film advancing means, a fan mounted on said shaft on the opposite side of the motor from said connecting means, a casing for said fan, and an air conduit extending from said casing to a point just outside the light beam where the film guiding means is spaced away from the lens holder, said conduit including an end section making an angle with the axis of the beam and adapted to direct a stream of air against the back of the film to cool the same.

3. In a sign projection apparatus, a light source, a housing for said source, means including said source and a lens system in one wall of said housing for forming a light beam, a film, means for moving said film across the path of said light beam, a motor mounted alongside said housing, means for connecting one end of the motor shaft to said film moving means, a fan mounted on the other end of the motor shaft, a casing for said fan opening into said housing, whereby the said fan circulates air through the housing, a second fan mounted on the motor shaft, a casing for the second fan, and an air conduit extending from the second casing to a point in rear of the film just outside the path of the said light beam and through which air is blown by the second fan against the back of the film.

CLYDE E. ELLIOTT.
FRANK SHAVEN.